US012762059B2

(12) United States Patent
Balakrishnan et al.

(10) Patent No.: US 12,762,059 B2
(45) Date of Patent: Oct. 13, 2026

(54) EXTENDED STORAGE FOR ZONE METADATA WITH USER DATA IN A MEMORY SYSTEM WITH A CACHE

(71) Applicant: Micron Technology, Inc., Boise, ID (US)

(72) Inventors: Thibash Rajamani Balakrishnan, Bangalore (IN); John J. Kane, Westminster, CO (US); Anirban Kundu, Bangalore (IN); Paul Roger Stonelake, Kihei, HI (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/208,545

(22) Filed: May 14, 2025

(65) Prior Publication Data

US 2025/0363056 A1 Nov. 27, 2025

Related U.S. Application Data

(60) Provisional application No. 63/651,866, filed on May 24, 2024.

(51) Int. Cl.
*G06F 12/0831* (2016.01)
*G06F 12/02* (2006.01)
*G06F 13/16* (2006.01)

(52) U.S. Cl.
CPC ...... *G06F 12/0833* (2013.01); *G06F 12/0246* (2013.01); *G06F 13/1642* (2013.01)

(58) Field of Classification Search
CPC ............. G06F 12/0833; G06F 12/0246; G06F 13/1642; G06F 3/0688; G06F 2212/7201; G06F 12/0895
See application file for complete search history.

(56) References Cited

U.S. PATENT DOCUMENTS 10,037,778 B1 7/2018 Farhan et al.
2011/0022779 A1* 1/2011 Lund .................. G06F 12/0246 711/170

(Continued)

FOREIGN PATENT DOCUMENTS

CN 103019953 A * 4/2013 ............ G06F 12/10

OTHER PUBLICATIONS

"International Search Report and Written Opinion of the International Searching Authority," issued in connection with Int'l Appl. No. PCT/US2025/030418, dated Sep. 4, 2025 (11 pages).

*Primary Examiner* — Christopher D Birkhimer
(74) *Attorney, Agent, or Firm* — Holland & Hart LLP

(57) ABSTRACT

Methods, systems, and devices for extended storage for zone metadata with user data in a memory system with a cache are described. The described techniques provide for a memory system to write data and a zone descriptor extension (ZDE) for a zone to a cache before flushing the data and the ZDE to a memory array, which may support re-writable ZDE information. The cache may be addressable using a logical-to-physical (L2P) table, and entries of the L2P table that map the ZDE in the cache may be included after entries of the L2P table that map user data in the cache, and the memory system may identify the current ZDE according to the L2P table region. When the zone is closed, the memory system may flush the data to the zone of the memory array and may migrate the last written ZDE information to a fixed location within the zone.

30 Claims, 6 Drawing Sheets

(56) References Cited

U.S. PATENT DOCUMENTS

| | | | | |
|---|---|---|---|---|
| 2017/0300422 | A1* | 10/2017 | Szubbocsev | G06F 12/1009 |
| 2017/0316027 | A1 | 11/2017 | Mondal et al. | |
| 2019/0324669 | A1* | 10/2019 | Widder | G06F 12/0246 |
| 2021/0089217 | A1 | 3/2021 | Bjørling et al. | |
| 2021/0286720 | A1* | 9/2021 | Beaverson | G06F 3/0608 |
| 2021/0342267 | A1 | 11/2021 | Lam et al. | |
| 2022/0083256 | A1* | 3/2022 | Muthiah | G06F 3/0604 |
| 2022/0214830 | A1 | 7/2022 | Lam | |
| 2023/0075437 | A1* | 3/2023 | Xu | G06F 12/0868 |
| 2023/0409218 | A1* | 12/2023 | Shveidel | G06F 3/0631 |

* cited by examiner

EXTENDED STORAGE FOR ZONE METADATA WITH USER DATA IN A MEMORY SYSTEM WITH A CACHE

CROSS REFERENCE

The present application for patent claims priority to U.S. Patent Application No. 63/651,866 by Balakrishnan et al., entitled "EXTENDED STORAGE FOR ZONE METADATA WITH USER DATA IN A MEMORY SYSTEM WITH A CACHE," filed May 24, 2024, which is assigned to the assignee hereof, and which is expressly incorporated by reference in its entirety herein.

TECHNICAL FIELD

The following relates to one or more systems for memory, including extended storage for zone metadata with user data in a memory system with a cache.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
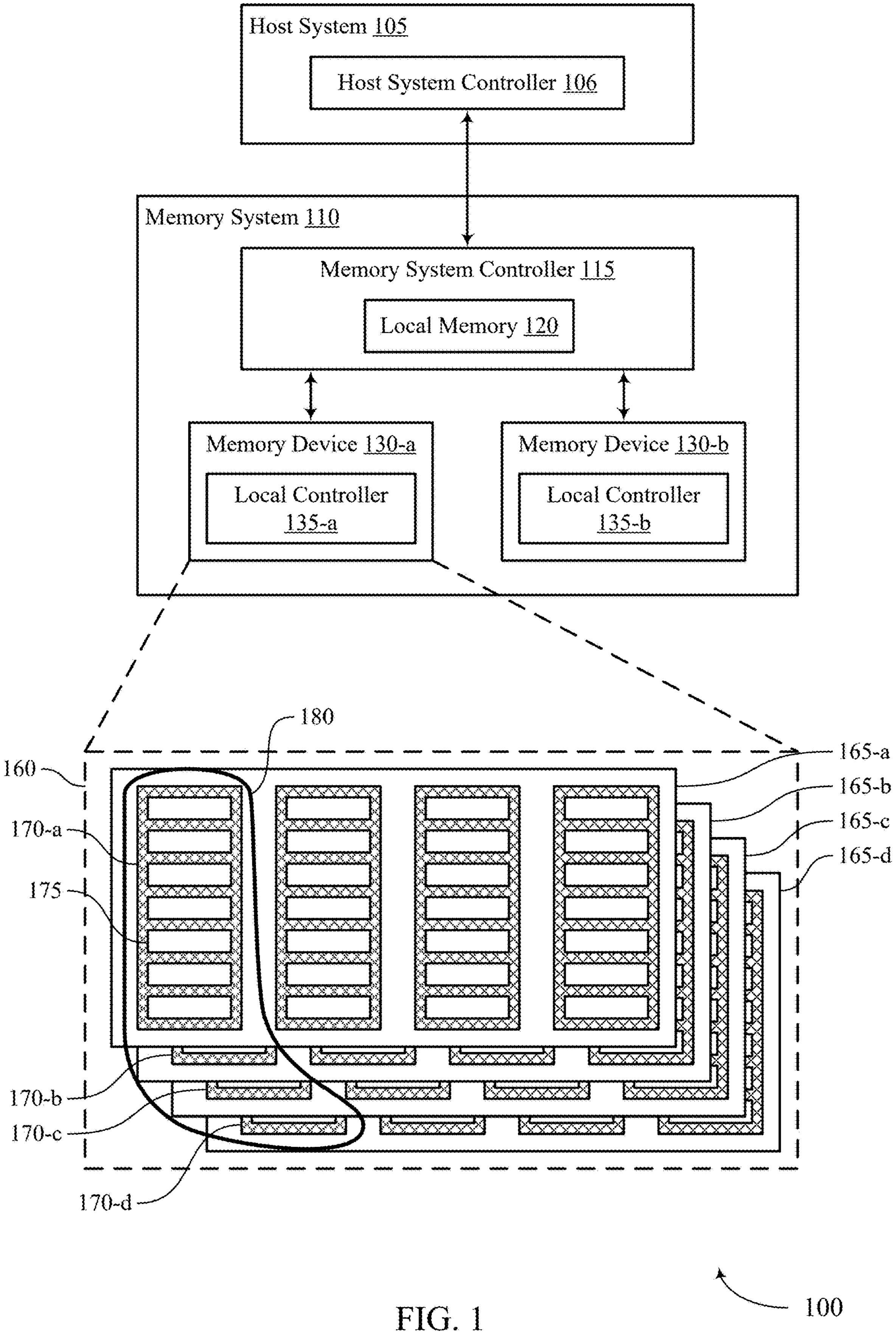
FIG. 1 shows an example of a system that supports extended storage for zone metadata with user data in a memory system with a cache in accordance with examples as disclosed herein.

Memory systems may operate according to various firmware architectures to facilitate storing and maintaining data in memory arrays. For example, a memory system may operate according to a zoned namespace (ZNS) architecture, where data may be stored across one or more zones within a memory array. Such one or more zones may be configured in accordance with an organizational size that supports maintaining contiguous portions of information (e.g., sequential information) in a common portion of storage. To support accessing and managing the one or more zones, the memory system may store a zone descriptor extension (ZDE) associated with each zone, which may include information, such as metadata, that indicates one or more parameters associated with a corresponding zone. A host system associated with the memory system may issue write commands to store data to a zone and the memory system may open (e.g., activate) the zone. Additionally, or alternatively, the host system may issue a command to write the ZDE (e.g., a set zone descriptor action in a zone management command) for the zone when the zone is opened.

In some examples, the host system may update the ZDE for the zone while the zone is still open (e.g., active) and may indicate the updated ZDE to the memory system. However, techniques for re-writing ZDE at the memory system may result in adverse effects or otherwise reduce a performance of the memory system. For example, storing a ZDE table in volatile memory (e.g., dynamic random access memory (DRAM)) may occupy a significant portion of the volatile memory and may result in additional power consumption and latency associated with flushing the ZDE table when the memory system transitions to a lower power state. As another example, the memory system may address ZDEs in unused memory regions between zones or at the end of a corresponding zone, which may reduce reliability in accessing the ZDEs in scenarios where a ZDE entry is greater than a region page size or zones do not include additional entries for storing ZDE.

Techniques described herein provide for a memory system to support one or more re-writable ZDEs for one or more active zones of the memory system. To support the re-writable ZDEs, the memory system may write data and the ZDE for a zone to a persistent (e.g., non-volatile) cache before flushing the data and the ZDE to a memory array. In some examples, by writing the ZDE to the persistent cache, the ZDE may be managed by the memory system similar to a user data transfer unit (TU) and may be re-writable (e.g., additional updated ZDEs may be written to the cache subsequent to one or more previous outdated ZDEs). The cache may be addressable using a logical-to-physical (L2P) table, and entries of the L2P table that map the ZDE in the cache may be included after entries of the L2P table that map user data (e.g., zone data) in the cache. For example, the L2P table region for the ZDE of a first zone may include multiple ZDEs (e.g., a set of known TU addresses associated with the first zone), and the memory system may identify the last written ZDE according to a most recent ZDE TU written in the L2P table region. In some cases, when the zone is closed (e.g., enough data is stored to the cache to fill the zone or a zone closure is otherwise triggered), the memory system may flush the data to the zone of the memory array, and may migrate the last written ZDE information to a location within the zone. Such techniques may support flexible and re-writable ZDEs for memory systems operating in accordance with a ZNS architecture, which may improve performance of the memory system.

In addition to applicability in memory systems as described herein, techniques for extended storage for zone metadata with user data may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by improving memory storage and management speeds, which may decrease processing or latency times, improve response times, or otherwise improve user experience, among other benefits.

In addition to applicability in memory systems described herein, techniques for extended storage for zone metadata with user data may be generally implemented to improve security and/or authentication features of various electronic devices and systems. As the use of electronic devices for handling private, user, or other sensitive information has become even more widespread, electronic devices and systems have become the target of increasingly frequent and sophisticated attacks. Further, unauthorized access or modification of data in security-critical devices such as vehicles, healthcare devices, and others may be especially concerning. Implementing the techniques described herein may improve the security of electronic devices and systems by improving reliability of zoned memory storage, and may prevent or mitigate malicious actors from inducing artificial wear on memory cells of the electronic devices and systems, among other benefits.

In addition to applicability in memory systems as described herein, techniques for extended storage for zone metadata with user data may be generally implemented to improve the sustainability of various electronic devices and systems. As the use of electronic devices has become even more widespread, the amount of energy used and harmful emissions associated with production of electronic devices and device operation has increased. Further, the amount of waste (e.g., electronic waste) associated with disposal of electronic devices may also pose environmental concerns. Implementing the techniques described herein may improve the impact related to electronic devices by reducing wear on components (e.g., memory cells) of the electronic devices, which may extend the life of electronic devices and thereby reduce electronic waste, among other benefits.

Features of the disclosure are illustrated and described in the context of systems, devices, and circuits. Features of the disclosure are further illustrated and described in the context of zone data storage schemes, a metadata addressing scheme, and flowcharts.

FIG. 1 shows an example of a system 100 that supports extended storage for zone metadata with user data in a memory system with a cache in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device

130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples of the system 100, the system 100 may support storing data according to a ZNS architecture. Such storage may include a memory system 110 opening a zone within a memory array of a memory device 130 for storing contiguous portions of information. In some examples, the zone may be opened within a block of multiple-level memory cells, such as QLCs among other examples, and the memory system 110 may store zone data (e.g., user data) to the zone. For example, to support accurate storage of data within the multiple-level memory cells, the memory system 110 may perform 2-pass programming (e.g., a coarse programming operation followed by a fine programming operation). However, such programming may incur relatively high latency at the memory system, which may prevent host data from being directly written to the one or more blocks of multiple-level memory cells, such as QLC blocks (e.g., due to the latency inhibiting the memory system 110 from matching the data transfer speed from the host system 105). To prevent losing host data, the memory system 110 may include other blocks, such as an intermediate layer of blocks (e.g., SLC blocks), and may utilize the blocks as a cache layer to store host data before the host data is written to the one or more blocks of multiple-level memory cells, such as QLC blocks. For example, the memory system 110 may flush data from the cache layer to the QLC blocks as a background process. The cache layer may operate similar to other block devices of the memory system 110 such that data is addressed according to LBAs and TUs (e.g., an addressable unit of data having a fixed size, such as 4 KB), and an L2P table provides information about where data is present in NAND memory. Once the data is stored to the one or more blocks of multiple-level memory cells, such as QLC blocks, the data and corresponding zones may be addressed by a separate zone management table (ZMT) maintained by the memory system.

In some examples, the memory system 110 may store ZDEs (e.g., metadata associated with respective zones of the memory system) in the cache along with user data and may manage the ZDEs similar to the user data. For example, the memory system 110 may store a ZDE as any other TU written to the cache, which may support the memory system 110 updating the ZDE while the zone is open and the data is in the cache. Such techniques may improve flexibility of the ZDE, which may improve ZNS based data storage by the memory system 110, among other advantages.

Figure 2A:
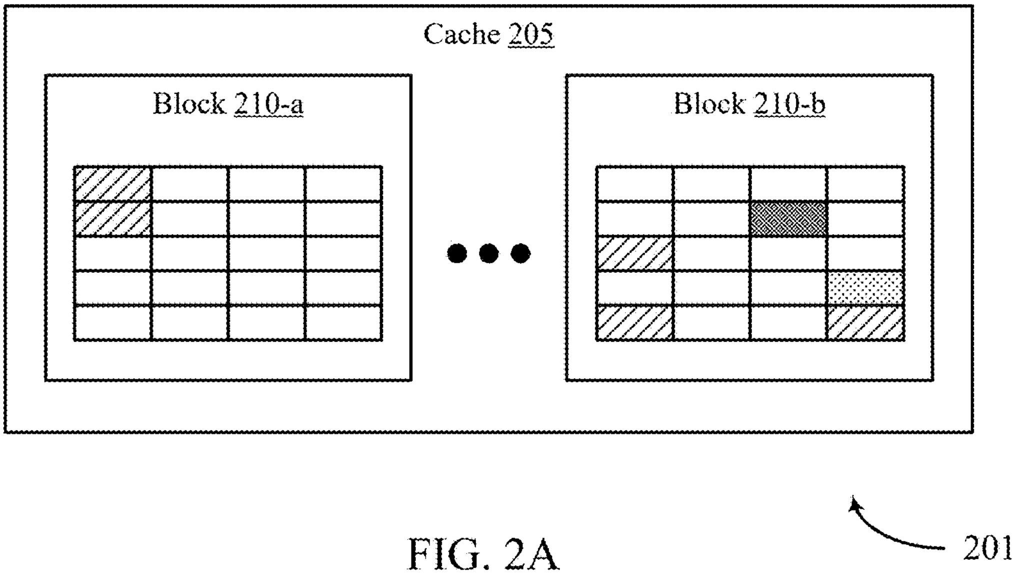
FIGS. 2A and 2B show examples of zone data storage schemes that support extended storage for zone metadata with user data in a memory system with a cache in accordance with examples as disclosed herein.
Figure 2B:
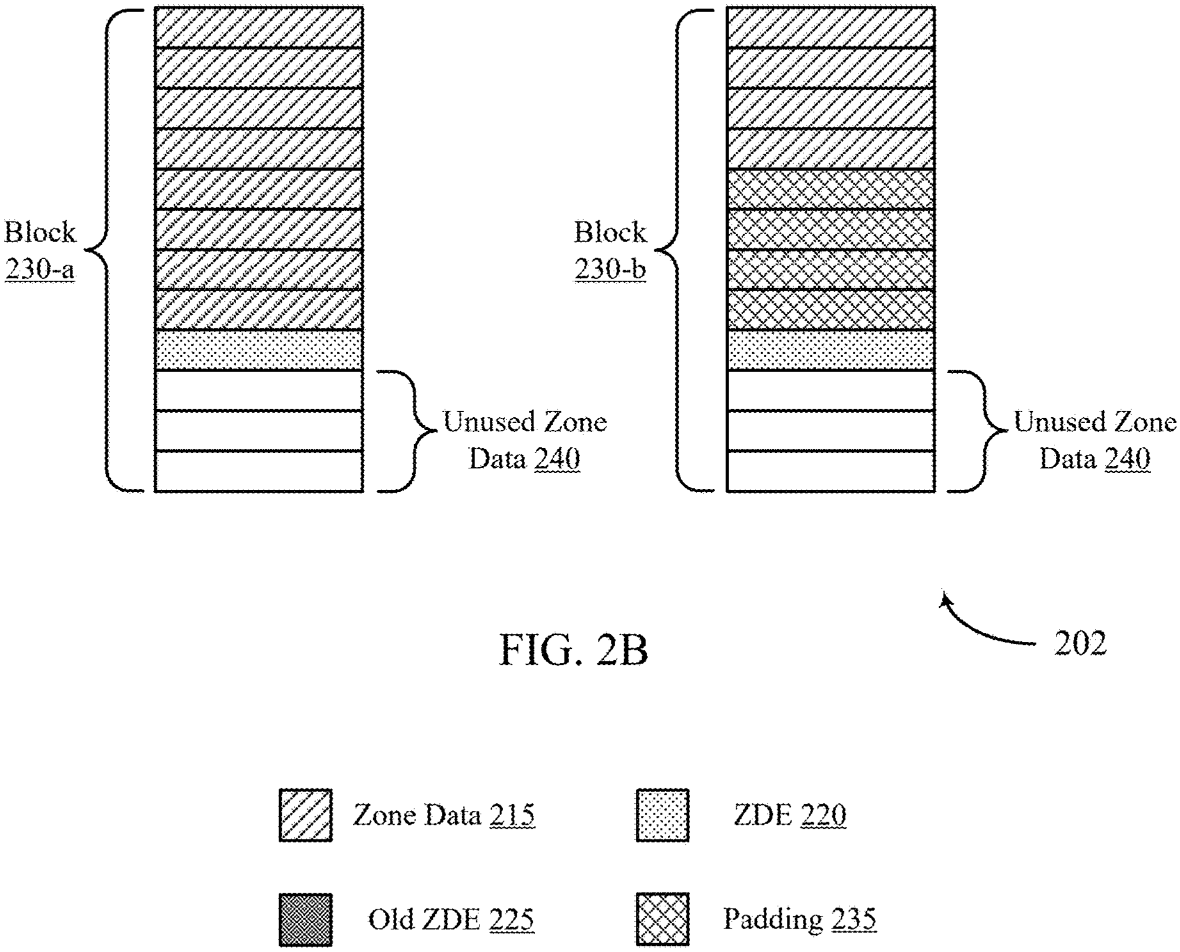

FIGS. 2A and 2B show examples of zone data storage schemes 201 and 202, respectively, that support extended storage for zone metadata with user data in a memory system with a cache in accordance with examples as disclosed herein. The zone data storage schemes 201 and 202 may implement, or be implemented by, one or more aspects of the system 100. For example, the zone data storage schemes 201 and 202 may be examples of data stored to various portions of memory within a memory system, which may be an example of a memory system 110 described with reference to FIG. 1. In some cases, the zone data storage schemes 201 and 202 may support storing zone data and ZDEs, for example, at a cache of the memory system and transferring the zone data and a most-current ZDE for a zone in a corresponding portion of a memory array, such as within a memory device 130 described with reference to FIG. 1.

Referring to FIG. 2A, the zone data storage scheme 201 illustrates a first stage of zone data and zone metadata storage by a memory system. The memory system may include a cache 205, which may be an example of a persistent (e.g., non-volatile) array of memory cells. For example, the cache 205 may include multiple blocks 210 (e.g., which may be examples of blocks 170 described with reference to FIG. 1, among other sections) including respective sets of memory cells, which may be sets of SLCs to leverage relatively quicker access speeds associated with SLCs. The blocks 210 may include a block 210-*a* (e.g., a first block, NAND block 0) and a block 210-*b* (e.g., a last block, NAND block N), and may additionally include one or more blocks 210, such as one or more blocks between the block 210-*a* and the block 210-*b* (e.g., N may be any integer value). In some examples, each block 210 may be partitioned in terms of TUs, which may represent a fixed quantity of storage space addressable by an L2P table (e.g., a minimum addressable unit of data, such as 4 KB). For example, the block 210-*a* and the block 210-*b* may each include one or more TUs of zone data 215, which may be data stored to various portions of the cache 205 and associated with a same opened zone within a memory array of the memory system (e.g., an array of multiple-level memory cells, such as QLCs). It should be noted that while the zone data storage scheme 201 illustrates an example of zone data 215 associated with a single zone, the cache 205 may include TUs storing data associated with any quantity of zones (e.g., one or more zones) and in any ordering within the cache 205 (e.g., data for various zones may be ordered in one way or another, such as being randomly interleaved, within the cache 205, such as in order of receipt).

In some examples, to begin storing the zone data 215 in the cache 205, the memory system may receive a command from a host system associated with the memory system (e.g., a host system 105 described with reference to FIG. 1) indicating to open a zone in the memory array of the memory system. For example, the memory system may receive a command, such as a zone management send command, triggering the opening of the zone and may receive (e.g., in the zone management send command or in a subsequent command) a ZDE 220 (and/or an indication of ZDE 220) associated with the zone. The ZDE 220 and/or the indication of the ZDE 220 may include metadata associated with the zone, such as a type of the zone (e.g., a sequential write zone), a state of the zone (e.g., empty, full, opened, or closed, among other examples), a pointer to a writable block of the zone (e.g., a write pointer to a next writable LBA of the zone), or a capacity of the zone, or any combination thereof, among other examples. In some examples, a size of the ZDE 220 may be an integer quantity of TUs (e.g., one instance of the ZDE 220 may occupy one or more TUs of the cache 205).

In some cases, the memory system may receive one or more commands indicating the zone data 215 to be written to the opened zone. For example, the memory system may write the zone data 215 to TUs of the cache 205 in accordance with write commands or append commands. The memory system may continue to store zone data 215 to blocks 210 of the cache 205 while the zone remains open, for example until a total size of the zone data 215 is equal to a capacity of the zone (e.g., opened in a memory array of the memory system), or until the host system triggers a closure of the zone (e.g., due to other factors or parameters), or another condition is met. Additionally, while the zone remains open, the memory system may support re-writing (e.g., updating) the ZDE 220. For example, if information included in the ZDE 220 changes while the zone is open, the host system may transmit a command to write updated ZDE to the cache 205 including the new information. In such examples, the memory system may store the updated ZDE as the ZDE 220 and may designate a previously-written ZDE as an old ZDE 225. Thus, the memory system may overwrite the old ZDE 225 without deleting the old ZDE 225.

In some cases, while the zone remains open, the host system may transmit a command to read the ZDE 220 or an old ZDE 225 (e.g., a zone management receive command), and the memory system may determine a location of the requested ZDE in the cache 205 and transmit the ZDE to the host system. To identify whether the zone is open, the host system (e.g., a controller of the host system) may reference information, such as a ZMT, which may store zone related information for each zone of the memory system. Additionally, to determine an address of the zone data 215 and the ZDE within the cache 205, the memory system may maintain information, such as an L2P table (e.g., spanning an address space of the cache 205), as described in greater detail with reference to FIG. 3.

Referring to FIG. 2B, the zone data storage scheme 202 illustrates a second stage of zone data and zone metadata storage by a memory system. The memory system may include a block 230, which may be an example of a block of multiple-level memory cells (e.g., QLCs, TLCs, MLCs) included in a memory array of the memory system. Additionally, the block 230 may be an example of a zone opened in the memory array in accordance with the ZNS architecture for storing zone data 215 and a ZDE 220.

The zone data storage scheme 202 may support various examples of the data stored to the block 230 after flushing (e.g., migrating) the zone data 215 and the ZDE 220 from the cache 205. For example, a block 230-*a* may illustrate an example of the memory system flushing the zone data 215 and the ZDE 220 once a total size of the zone data 215 stored to the cache satisfies a threshold size (e.g., a capacity of the zone). As another example, a block 230-*b* may illustrate an example of the memory system flushing the zone data 215 and the ZDE 220 based on a trigger from the host system (e.g., due to one or more factors or parameters in which flushing early is beneficial). The memory system may include padding 235 (e.g., bits indicating non-useful information) in some examples in order to maintain a similar size across the zones of one or more memory arrays of the memory system. In some cases, the memory system may write the ZDE 220 to a fixed position within the block 230. For example, the memory system may write the ZDE 220 to a page of the block 230 (e.g., page n, which may be a known floating-point address (FPA) within the block 230) that occurs after the zone data 215 or after the padding 235 (if present). Additionally, the block 230 may include one or more unused zone data 240 pages, which may be located at the end of the block 230 (e.g., providing a buffer between zones of the memory system).

The memory system may update information, such an entry in the ZMT, corresponding to the zone opened at the block 230 after flushing the zone data 215 and the ZDE 220 to indicate that the data is stored to the block 230. In some examples, the memory system may deallocate the zone data 215 and the ZDE 220 from the blocks 210 of the cache 205 based on flushing the data to the block 230. Additionally, the memory system may deallocate the L2P mappings for the zone data 215 and the ZDE 220 based on flushing the data to the block 230. The host system may reference the ZMT to identify that the zone data 215 and ZDE 220 are stored to the block 230, and may read the ZDE 220 according to a known offset relative to the fixed position of the ZDE 220 within the block 230.

Figure 3:
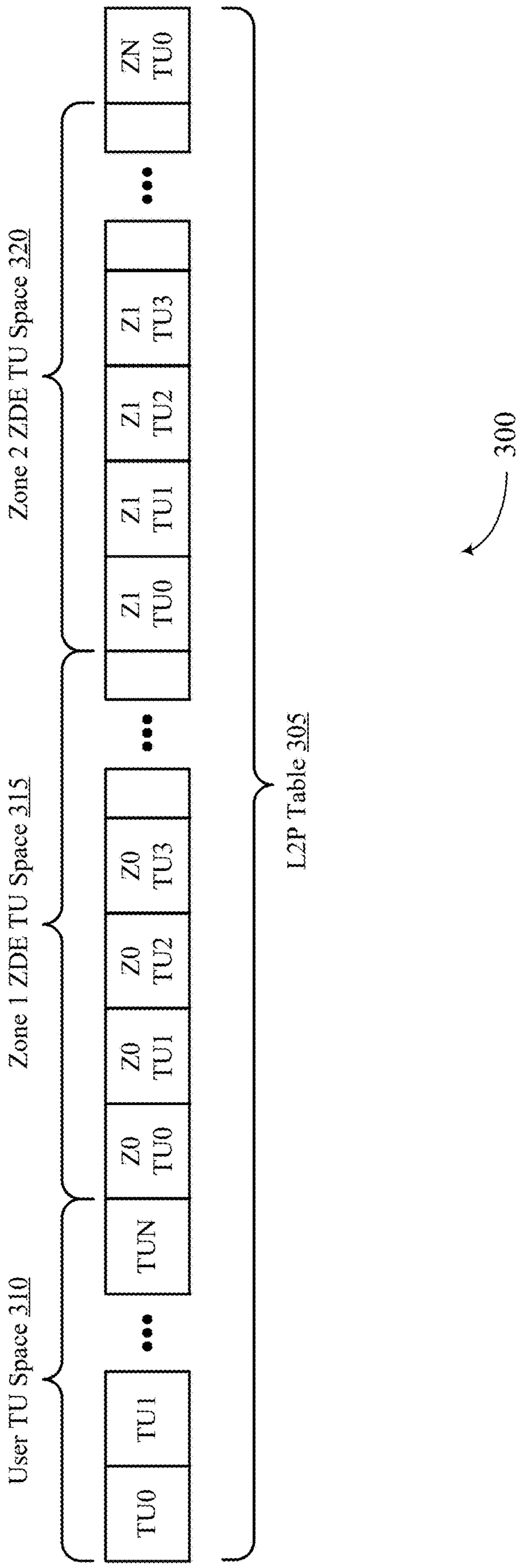
FIG. 3 shows an example of a zone descriptor extension (ZDE) addressing scheme that supports extended storage for zone metadata with user data in a memory system with a cache in accordance with examples as disclosed herein.

FIG. 3 shows an example of a ZDE addressing scheme 300 that supports extended storage for zone metadata with user data in a memory system with a cache in accordance with examples as disclosed herein. The ZDE addressing scheme 300 may implement, or be implemented by, one or more aspects of the system 100 and the zone data storage schemes 201 and 202. For example, the ZDE addressing scheme 300 may be an example of an L2P table 305 that maps logical addresses associated with zone data and ZDEs to physical TU addresses within a cache, which may be an example of the cache 205 described with reference to FIG. 2A and FIG. 2B (e.g., a cache of SLCs). The L2P table 305 may be stored to a set of memory cells of a memory system (e.g., a memory system 110 described with reference to FIG. 1), such as within a portion of the cache that stores the zone data and the ZDEs, within volatile memory of the memory system (e.g., a RAM cache), within a block of non-volatile memory cells included in the memory system, or the like.

The L2P table 305 may include a user TU space 310, which may be a set of entries that map user data (e.g., zone data) to physical addresses within the cache. In some cases, sequential entries of the user TU space 310 may map data associated with a common zone or sequential entries of the user TU space 310 may map data associated with different zones (e.g., according to an order of receipt of TUs). In some examples, the user TU space 310 may include N TU mappings, which may correspond to an address space of the cache configured for storing zone data.

The L2P table 305 may include one or more TU spaces for addressing ZDE information associated with one or more respective zones of the memory system (e.g., due to ZDE information being addressed and managed similar to user data stored to the cache). In some cases, the TU space for addressing ZDE information for a zone may be a layer-2 (L2) region of the L2P table 305. For example, a starting TU address for the ZDE addressing space may align with an L2 region page boundary, which may simplify L2 region loading and unloading procedures. When a zone is opened, the memory system may load associated L2 regions to enable access to the LBA user space and the L2P table 305 space that includes the associated zone ZDE data. In some cases, when the zone completes migration (e.g., from the cache to the memory array, such as to a block 230 described with reference to FIG. 2B), the loaded L2 regions may be removed. By aligning the ZDE information with L2 region boundaries and preventing a single L2 region from addressing ZDE information for multiple zones, the memory system may eliminate, impact, or otherwise mitigate adverse effects associated with unloading a L2 region if ZDE information for other zones are still open within the cache. Further, the memory system may avoid loading an L2 region for a ZDE for a zone when the L2 region was already loaded to access ZDE for a neighboring zone.

The entries that map the ZDE information may be included after the user TU space 310 in the L2P table 305. For example, a zone 1 ZDE TU space 315 may include a quantity of entries (e.g., relatively fewer entries in comparison to the user TU space 310) reserved for mapping one or more instances of ZDE information for a first zone. In some cases, a first entry of the zone 1 ZDE TU space 315 (e.g., Z0 TU0) may map an initially written ZDE for the first zone, and subsequent entries of the zone 1 ZDE TU space 315 (e.g., Z0 TU1, Z0 TU2, and so on) may be available for mapping updated ZDE information for the first zone. In some examples, the memory system may identify which ZDE information for the first zone is most current according to a highest index of the zone 1 ZDE TU space 315 that includes a mapping to a ZDE written to the cache. The L2P table 305 may further include TU spaces associated with subsequent zones, such as a zone 2 ZDE TU space 320 which maps ZDE information for a second zone and one or more additional TU spaces for mapping ZDE information associated with any quantity of zones (e.g., N zones). In some examples, the ZDE TU spaces of the L2P table 305 may be separated by a gap to maintain the alignment between each ZDE TU space and an L2 region boundary.

In some examples, the memory system may identify, in the L2P table 305, a starting TU address for mapping ZDE information for a zone according to a last TU address of the user TU space 310, an index of the zone, and a quantity of TUs per L2 region of the L2P table 305. For example, the memory system may calculate the starting TU address for an individual zone ZDE according to the product of the zone index and the quantity of TUs per L2 region offset by the TUs of the user TU space 310 (e.g., LastUserDataTuAddress+ZoneIndex*TUsPerL2Region).

Such techniques may improve flexibility of storing and updating ZDE information for zones of the memory system, which may support accurate and consistent management of data stored according to a ZNS architecture, among other benefits.

Figure 4:
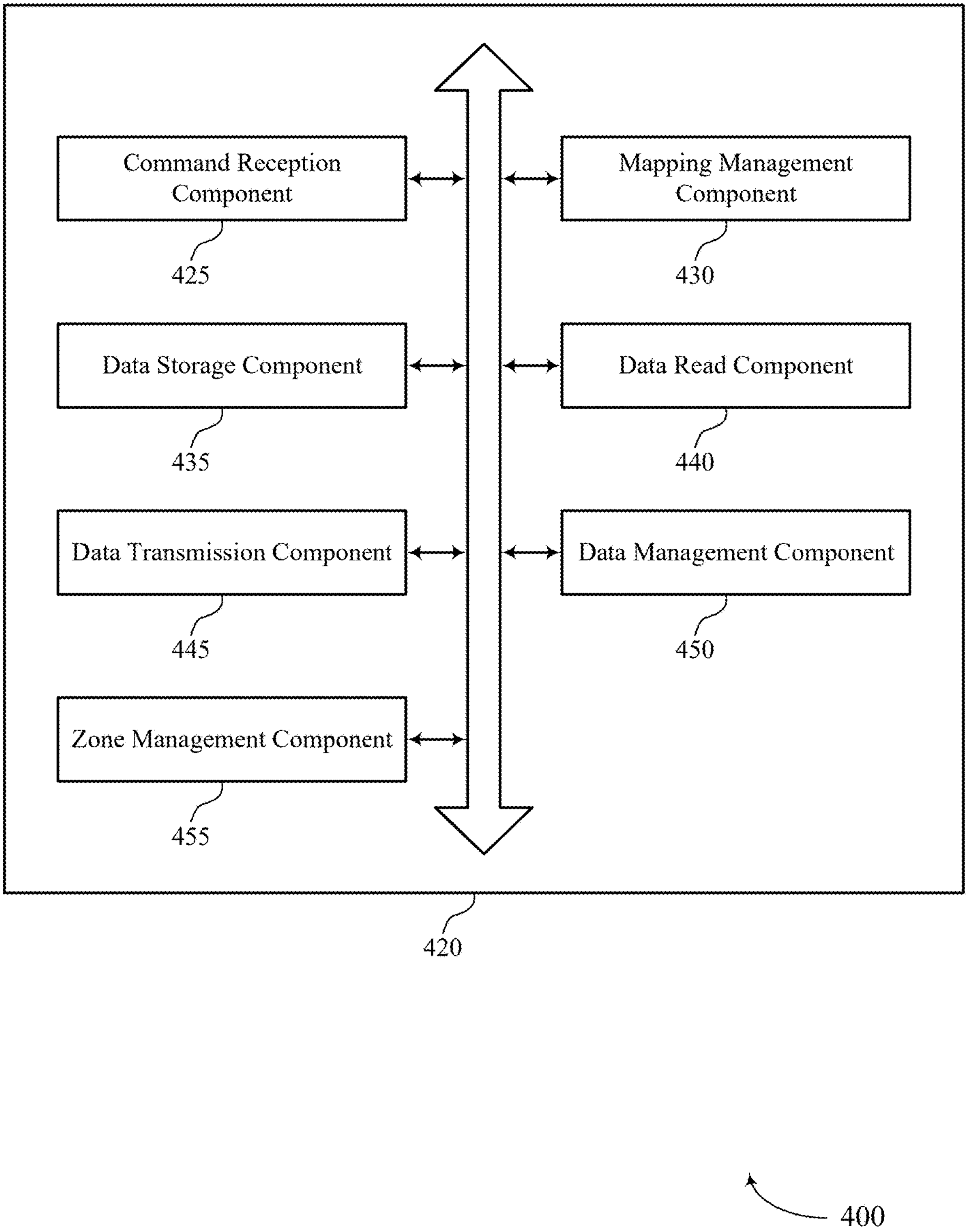
FIG. 4 shows a block diagram of a memory system that supports extended storage for zone metadata with user data in a memory system with a cache in accordance with examples as disclosed herein.

FIG. 4 shows a block diagram 400 of a memory system 420 that supports extended storage for zone metadata with user data in a memory system with a cache in accordance with examples as disclosed herein. The memory system 420 may be an example of aspects of a memory system as described with reference to FIGS. 1 through 3. The memory system 420, or various components thereof, may be an example of means for performing various aspects of extended storage for zone metadata with user data in a memory system with a cache as described herein. For example, the memory system 420 may include a command reception component 425, a mapping management component 430, a data storage component 435, a data read component 440, a data transmission component 445, a data management component 450, a zone management component 455, or any combination thereof. Each of these components, or components of subcomponents thereof (e.g., one or more processors, one or more memories), may communicate, directly or indirectly, with one another (e.g., via one or more buses).

The command reception component 425 may be configured as or otherwise support a means for receiving, by a memory system, a zone descriptor command including metadata associated with a zone of a plurality of zones of a memory array of the memory system. The mapping management component 430 may be configured as or otherwise support a means for storing, to a cache of the memory system based at least in part on the zone descriptor command, one or more first entries that map the metadata to first physical addresses of a plurality of physical addresses in the cache, where the cache includes one or more second entries that map data associated with the plurality of zones to respective second physical addresses of the plurality of physical addresses in the cache. The data storage component 435 may be configured as or otherwise support a means for writing the metadata to the first physical addresses in the cache based at least in part on the one or more first entries. In some examples, the data storage component 435 may be configured as or otherwise support a means for transferring the metadata and a subset of the data mapped by the one or more second entries from the cache to the zone in the memory array based at least in part on writing the metadata to the first physical addresses in the cache, where the subset of the data is associated with the zone.

In some examples, the command reception component 425 may be configured as or otherwise support a means for receiving a second zone descriptor command including second metadata associated with the zone. In some examples, the mapping management component 430 may be configured as or otherwise support a means for updating the one or more first entries to map the second metadata to third physical addresses of the plurality of physical addresses in the cache. In some examples, the data storage component 435 may be configured as or otherwise support a means for writing the second metadata to the third physical addresses in the cache based at least in part on the one or more first entries.

In some examples, the command reception component 425 may be configured as or otherwise support a means for receiving a second zone descriptor command including second metadata associated with a second zone of the plurality of zones. In some examples, the mapping management component 430 may be configured as or otherwise support a means for storing, to the cache based at least in part on the second zone descriptor command, one or more third entries that map the second metadata to third physical addresses of the plurality of physical addresses in the cache. In some examples, the data storage component 435 may be configured as or otherwise support a means for writing the second metadata to the third physical addresses in the cache based at least in part on the one or more third entries.

In some examples, the command reception component 425 may be configured as or otherwise support a means for receiving, from a host system coupled with the memory system, a zone descriptor read command including an indication of the zone. In some examples, the data read component 440 may be configured as or otherwise support a means for identifying, based at least in part on the indication of the zone, the one or more first entries that map the metadata to the first physical addresses within the cache. In some examples, the data read component 440 may be configured as or otherwise support a means for retrieving, from the first physical addresses, the metadata based at least in part on identifying the one or more first entries. In some examples, the data transmission component 445 may be configured as or otherwise support a means for transmitting, based at least in part on the zone descriptor read command and retrieving the metadata, the metadata to the host system.

In some examples, the data management component 450 may be configured as or otherwise support a means for deleting the metadata from the cache based at least in part on transferring the metadata and the subset of the data to the zone in the memory array. In some examples, the mapping management component 430 may be configured as or otherwise support a means for deleting, based at least in part on deleting the metadata, the one or more first entries from the cache.

In some examples, to support transferring the metadata and the subset of the data from the cache to the zone in the memory array, the data storage component 435 may be configured as or otherwise support a means for writing the subset of the data to sequential pages of one or more memory blocks included in the zone of the memory array. In some examples, to support transferring the metadata and the subset of the data from the cache to the zone in the memory array, the data storage component 435 may be configured as or otherwise support a means for writing the metadata to one or more pages within the zone of the memory array.

In some examples, the mapping management component 430 may be configured as or otherwise support a means for storing, in the memory array, an indication of a starting logical block address associated with the zone and a logical block address associated with the one or more pages for the metadata.

In some examples, the data management component 450 may be configured as or otherwise support a means for storing, in the memory array, null data within one or more pages between the subset of the data and an ending address of the zone based at least in part on a size of the subset of the data being less than a size of the zone.

In some examples, the one or more first entries are associated with a first address range within the cache; the one or more second entries are associated with a second address range within the cache; and an offset between the first address range and the second address range is based at least in part on an index of the zone and a quantity of addresses included in each set of a plurality of sets of entries stored in the cache.

In some examples, a starting address for respective metadata included in each set of the plurality of sets of entries stored in the cache is aligned with a starting page boundary for the respective set.

In some examples, the command reception component 425 may be configured as or otherwise support a means for receiving one or more write commands including the subset of the data and one or more logical block addresses associated with the subset of the data, the one or more logical block addresses associated with the zone in the memory array. In some examples, the mapping management component 430 may be configured as or otherwise support a means for storing, to the cache of the memory system based at least in part on the one or more write commands, one or more third entries that map the one or more logical block addresses to respective physical addresses of the plurality of physical addresses in the cache. In some examples, the data storage component 435 may be configured as or otherwise support a means for writing the subset of the data to the respective physical addresses based at least in part on the one or more third entries, where transferring the metadata and the subset of the data from the cache to the memory array is based at least in part on the subset of the data that is written to the cache filling an address space of the zone.

In some examples, the zone management component 455 may be configured as or otherwise support a means for activating the zone for memory accesses, where storing the one or more first entries and writing the metadata to the cache is based at least in part on activating the zone associated with the one or more first entries and the metadata. In some examples, the zone management component 455 may be configured as or otherwise support a means for deactivating the zone based at least in part on transferring the metadata and the subset of the data to the memory array. In some examples, the mapping management component 430 may be configured as or otherwise support a means for deleting the one or more first entries and the metadata from the cache based at least in part on deactivating the zone.

In some examples, the memory array includes a plurality of multi-level memory cells and the cache includes a plurality of single-level memory cells.

In some examples, the metadata indicates a type of the zone, a state of the zone, a pointer to a writeable block in the zone, or a capacity of the zone, or any combination thereof.

In some examples, the command reception component 425 may be configured as or otherwise support a means for receiving, by a memory system, a zone descriptor command including metadata associated with a zone of a plurality of zones of a memory array of the memory system, where the memory array includes a plurality of multi-level memory cells. In some examples, the mapping management component 430 may be configured as or otherwise support a means for storing, to a logical-to-physical table in a cache of the memory system based at least in part on the zone descriptor command, one or more first logical-to-physical entries that map the metadata to first physical addresses of a plurality of physical addresses in a cache, where the cache includes a plurality of single-level memory cells and is configured to store data associated with the plurality of zones. In some examples, the data storage component 435 may be configured as or otherwise support a means for writing the metadata to the first physical addresses in the cache based at least in part on the one or more first logical-to-physical entries. In some examples, the data storage component 435 may be configured as or otherwise support a means for transferring the metadata and a subset of the data from the cache to one or more multi-level memory cells in the zone in the memory array based at least in part on writing the metadata to the first physical addresses in the cache, where the subset of the data is associated with the zone.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

Figure 5:
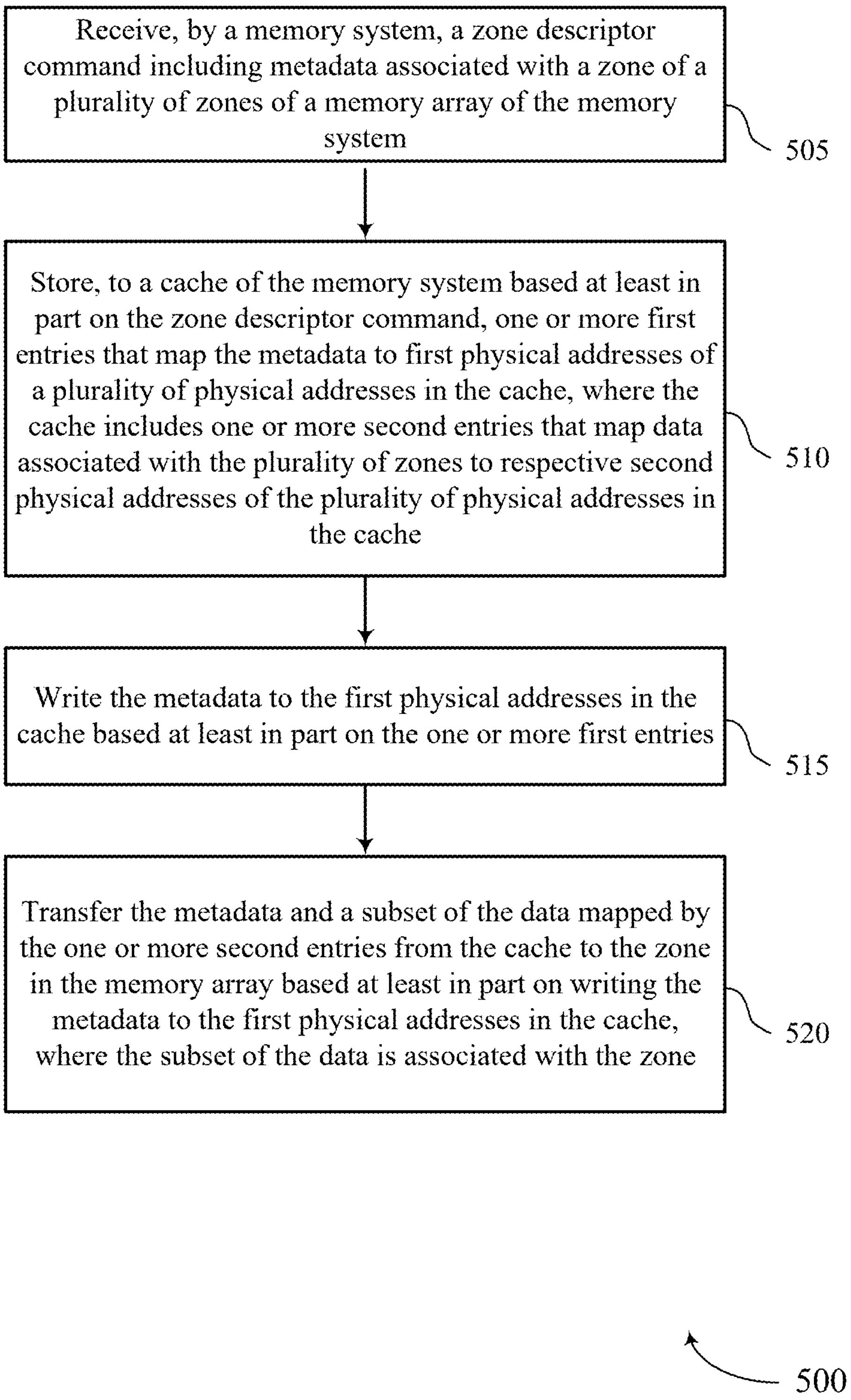
FIGS. 5 and 6 show flowcharts illustrating methods that support extended storage for zone metadata with user data in a memory system with a cache in accordance with examples as disclosed herein.

FIG. 5 shows a flowchart illustrating a method 500 that supports extended storage for zone metadata with user data in a memory system with a cache in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving, by a memory system, a zone descriptor command including metadata associated with a zone of a plurality of zones of a memory array of the memory system. In some examples, aspects of the operations of 505 may be performed by a command reception component 425 as described with reference to FIG. 4.

At 510, the method may include storing, to a cache of the memory system based at least in part on the zone descriptor command, one or more first entries that map the metadata to first physical addresses of a plurality of physical addresses in the cache, where the cache includes one or more second entries that map data associated with the plurality of zones to respective second physical addresses of the plurality of physical addresses in the cache. In some examples, aspects of the operations of 510 may be performed by a mapping management component 430 as described with reference to FIG. 4.

At 515, the method may include writing the metadata to the first physical addresses in the cache based at least in part on the one or more first entries. In some examples, aspects of the operations of 515 may be performed by a data storage component 435 as described with reference to FIG. 4.

At 520, the method may include transferring the metadata and a subset of the data mapped by the one or more second entries from the cache to the zone in the memory array based at least in part on writing the metadata to the first physical addresses in the cache, where the subset of the data is associated with the zone. In some examples, aspects of the operations of 520 may be performed by a data storage component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, by a memory system, a zone descriptor command including metadata associated with a zone of a plurality of zones of a memory array of the memory system; storing, to a cache of the memory system based at least in part on the zone descriptor command, one or more first entries that map the metadata to first physical addresses of a plurality of physical addresses in the cache, where the cache includes one or more second entries that map data associated with the plurality of zones to respective second physical addresses of the plurality of physical addresses in the cache; writing the metadata to the first physical addresses in the cache based at least in part on the one or more first entries; and transferring the metadata and a subset of the data mapped by the one or more second entries from the cache to the zone in the memory array based at least in part on writing the metadata to the first physical addresses in the cache, where the subset of the data is associated with the zone.

Aspect 2: The method, apparatus, or non-transitory computer-readable medium of aspect 1, further including operations, features, circuitry, logic, means, or instructions, or any combination thereof for receiving a second zone descriptor command including second metadata associated with the zone; updating the one or more first entries to map the second metadata to third physical addresses of the plurality of physical addresses in the cache; and writing the second metadata to the third physical addresses in the cache based at least in part on the one or more first entries.

Aspect 3: The method, apparatus, or non-transitory computer-readable medium of any of aspects 1 through 2, further including operations, features, circuitry, logic, means, or instructions, or any combination thereof for receiving a second zone descriptor command including second metadata associated with a second zone of the plurality of zones; storing, to the cache based at least in part on the second zone descriptor command, one or more third entries that map the second metadata to third physical addresses of the plurality of physical addresses in the cache; and writing the second metadata to the third physical addresses in the cache based at least in part on the one or more third entries.

Aspect 4: The method, apparatus, or non-transitory computer-readable medium of any of aspects 1 through 3, further including operations, features, circuitry, logic, means, or instructions, or any combination thereof for receiving, from a host system coupled with the memory system, a zone descriptor read command including an indication of the zone; identifying, based at least in part on the indication of the zone, the one or more first entries that map the metadata to the first physical addresses within the cache; retrieving, from the first physical addresses, the metadata based at least in part on identifying the one or more first entries; and transmitting, based at least in part on the zone descriptor read command and retrieving the metadata, the metadata to the host system.

Aspect 5: The method, apparatus, or non-transitory computer-readable medium of any of aspects 1 through 4, further including operations, features, circuitry, logic, means, or instructions, or any combination thereof for deleting the metadata from the cache based at least in part on transferring the metadata and the subset of the data to the zone in the memory array and deleting, based at least in part on deleting the metadata, the one or more first entries from the cache.

Aspect 6: The method, apparatus, or non-transitory computer-readable medium of any of aspects 1 through 5, where transferring the metadata and the subset of the data from the cache to the zone in the memory array includes operations, features, circuitry, logic, means, or instructions, or any combination thereof for writing the subset of the data to sequential pages of one or more memory blocks included in the zone of the memory array and writing the metadata to one or more pages within the zone of the memory array.

Aspect 7: The method, apparatus, or non-transitory computer-readable medium of aspect 6, further including operations, features, circuitry, logic, means, or instructions, or any combination thereof for storing, in the memory array, an indication of a starting logical block address associated with the zone and a logical block address associated with the one or more pages for the metadata.

Aspect 8: The method, apparatus, or non-transitory computer-readable medium of any of aspects 6 through 7, further including operations, features, circuitry, logic, means, or instructions, or any combination thereof for storing, in the memory array, null data within one or more pages between the subset of the data and an ending address of the zone based at least in part on a size of the subset of the data being less than a size of the zone.

Aspect 9: The method, apparatus, or non-transitory computer-readable medium of any of aspects 1 through 8, where the one or more first entries are associated with a first address range within the cache; the one or more second entries are associated with a second address range within the cache; and an offset between the first address range and the second address range is based at least in part on an index of the zone and a quantity of addresses included in each set of a plurality of sets of entries stored in the cache.

Aspect 10: The method, apparatus, or non-transitory computer-readable medium of aspect 9, where a starting address for respective metadata included in each set of the plurality of sets of entries stored in the cache is aligned with a starting page boundary for the respective set.

Aspect 11: The method, apparatus, or non-transitory computer-readable medium of any of aspects 1 through 10, further including operations, features, circuitry, logic, means, or instructions, or any combination thereof for receiving one or more write commands including the subset of the data and one or more logical block addresses associated with the subset of the data, the one or more logical block addresses associated with the zone in the memory array; storing, to the cache of the memory system based at least in part on the one or more write commands, one or more third entries that map the one or more logical block addresses to respective physical addresses of the plurality of physical addresses in the cache; and writing the subset of the data to the respective physical addresses based at least in part on the one or more third entries, where transferring the metadata and the subset of the data from the cache to the memory array is based at least in part on the subset of the data that is written to the cache filling an address space of the zone.

Aspect 12: The method, apparatus, or non-transitory computer-readable medium of any of aspects 1 through 11, further including operations, features, circuitry, logic, means, or instructions, or any combination thereof for activating the zone for memory accesses, where storing the one or more first entries and writing the metadata to the cache is based at least in part on activating the zone associated with the one or more first entries and the metadata; deactivating the zone based at least in part on transferring the metadata and the subset of the data to the memory array; and deleting the one or more first entries and the metadata from the cache based at least in part on deactivating the zone.

Aspect 13: The method, apparatus, or non-transitory computer-readable medium of any of aspects 1 through 12, where the memory array includes a plurality of multi-level memory cells and the cache includes a plurality of single-level memory cells.

Aspect 14: The method, apparatus, or non-transitory computer-readable medium of any of aspects 1 through 13, where the metadata indicates a type of the zone, a state of the zone, a pointer to a writeable block in the zone, or a capacity of the zone, or any combination thereof.

It should be noted that the described techniques include possible implementations, and that the operations and the steps may be rearranged or otherwise modified and that other implementations are possible. Further, portions from two or more of the methods may be combined.

Figure 6:
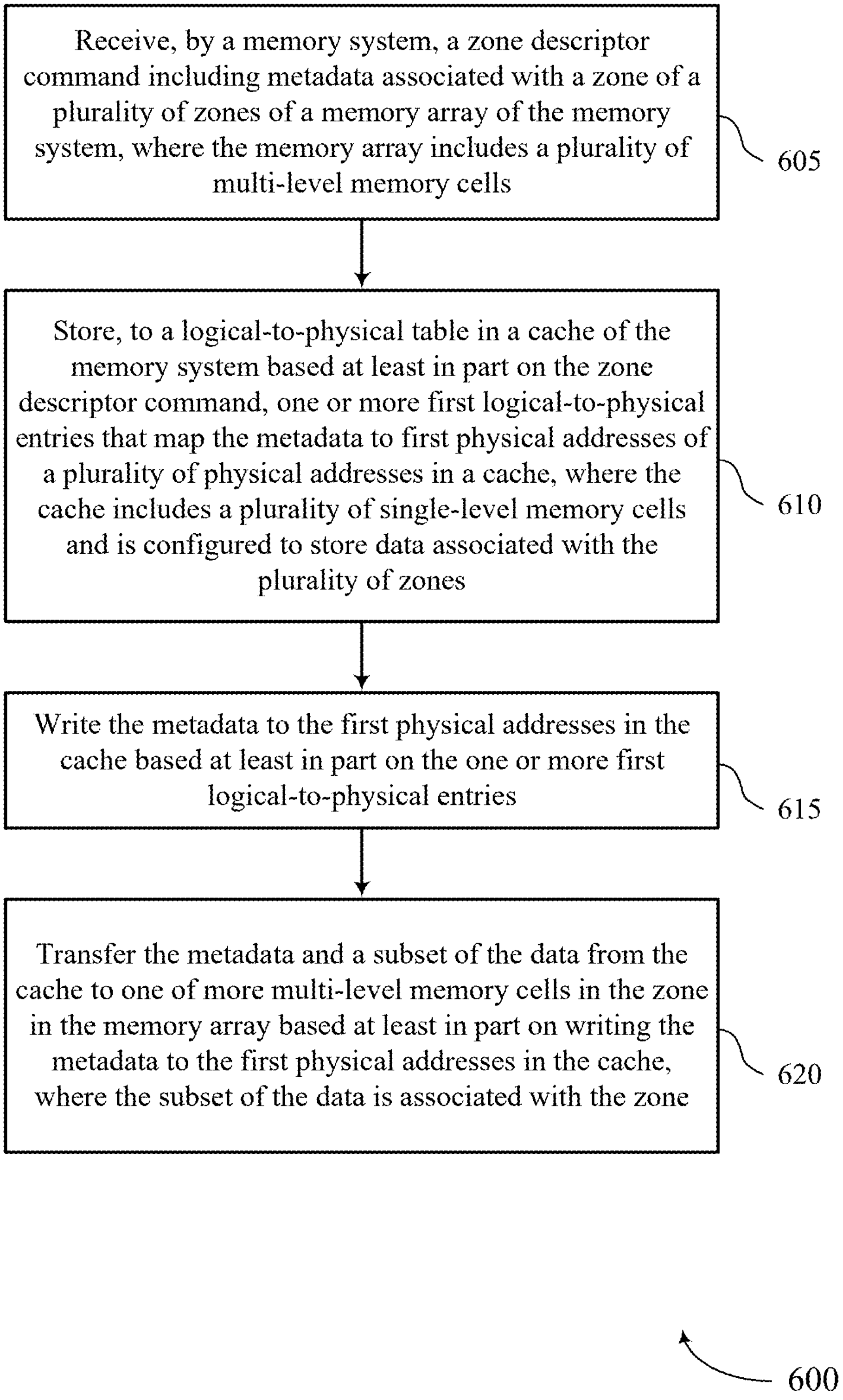

FIG. 6 shows a flowchart illustrating a method 600 that supports extended storage for zone metadata with user data in a memory system in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 605, the method may include receiving, by a memory system, a zone descriptor command including metadata associated with a zone of a plurality of zones of a memory array of the memory system, where the memory array includes a plurality of multi-level memory cells. In some examples, aspects of the operations of 605 may be performed by a command reception component 425 as described with reference to FIG. 4.

At 610, the method may include storing, to a logical-to-physical table in a cache of the memory system based at least in part on the zone descriptor command, one or more first logical-to-physical entries that map the metadata to first physical addresses of a plurality of physical addresses in a cache, where the cache includes a plurality of single-level memory cells and is configured to store data associated with the plurality of zones. In some examples, aspects of the operations of 610 may be performed by a mapping management component 430 as described with reference to FIG. 4.

At 615, the method may include writing the metadata to the first physical addresses in the cache based at least in part on the one or more first logical-to-physical entries. In some examples, aspects of the operations of 615 may be performed by a data storage component 435 as described with reference to FIG. 4.

At 620, the method may include transferring the metadata and a subset of the data from the cache to one or more multi-level memory cells in the zone in the memory array based at least in part on writing the metadata to the first physical addresses in the cache, where the subset of the data is associated with the zone. In some examples, aspects of the operations of 620 may be performed by a data storage component 435 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 15: A method, apparatus, or non-transitory computer-readable medium including operations, features, circuitry, logic, means, or instructions, or any combination thereof for receiving, by a memory system, a zone descriptor command including metadata associated with a zone of a plurality of zones of a memory array of the memory system, where the memory array includes a plurality of multi-level memory cells; storing, to a logical-to-physical table in a cache of the memory system based at least in part on the zone descriptor command, one or more first logical-to-physical entries that map the metadata to first physical addresses of a plurality of physical addresses in a cache, where the cache includes a plurality of single-level memory cells and is configured to store data associated with the plurality of zones; writing the metadata to the first physical addresses in the cache based at least in part on the one or more first logical-to-physical entries; and transferring the metadata and a subset of the data from the cache to one or more multi-level memory cells in the zone in the memory array based at least in part on writing the metadata to the first physical addresses in the cache, where the subset of the data is associated with the zone.

Aspect 16: The method, apparatus, or non-transitory computer-readable medium of aspect 15, further including operations, features, circuitry, logic, means, or instructions, or any combination thereof for receiving a second zone descriptor command including second metadata associated with the zone; updating the one or more first logical-to-physical entries to map the second metadata to second physical addresses of the plurality of physical addresses in the cache; and writing the second metadata to the second physical addresses in the cache based on the one or more first logical-to-physical entries.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more caches comprising a plurality of memory cells of a first type;

one or more memory arrays coupled with the one or more caches and comprising a plurality of memory cells of a second type, wherein the plurality of memory cells are included in a plurality of zones each comprising one or more blocks of memory cells; and processing circuitry configured to cause the memory system to:

receive a zone descriptor command comprising metadata associated with a zone of the plurality of zones of the one or more memory arrays;

store, to a cache of the one or more caches based at least in part on the zone descriptor command, one or more first entries that map the metadata to first physical addresses of a plurality of physical addresses in the cache, wherein the cache comprises one or more second entries that map data associated with the plurality of zones to respective second physical addresses of the plurality of physical addresses in the cache;

write the metadata to the first physical addresses in the cache based at least in part on the one or more first entries; and transfer the metadata and a subset of the data mapped by the one or more second entries from the cache to the zone in the one or more memory arrays based at least in part on writing the metadata to the first physical addresses in the cache, wherein the subset of the data is associated with the zone.

2. The memory system of claim 1, wherein the processing circuitry is further configured to cause the memory system to:

receive a second zone descriptor command comprising second metadata associated with the zone;

update the one or more first entries to map the second metadata to third physical addresses of the plurality of physical addresses in the cache; and write the second metadata to the third physical addresses in the cache based at least in part on the one or more first entries.

3. The memory system of claim 1, wherein the processing circuitry is further configured to cause the memory system to:

receive a second zone descriptor command comprising second metadata associated with a second zone of the plurality of zones;

store, to the cache based at least in part on the second zone descriptor command, one or more third entries that map the second metadata to third physical addresses of the plurality of physical addresses in the cache; and write the second metadata to the third physical addresses in the cache based at least in part on the one or more third entries.

4. The memory system of claim 1, wherein the processing circuitry is further configured to cause the memory system to:

receive, from a host system coupled with the memory system, a zone descriptor read command comprising an indication of the zone;

identify, based at least in part on the indication of the zone, the one or more first entries that map the metadata to the first physical addresses within the cache;

retrieve, from the first physical addresses, the metadata based at least in part on identifying the one or more first entries; and transmit, based at least in part on the zone descriptor read command and retrieving the metadata, the metadata to the host system.

5. The memory system of claim 1, wherein the processing circuitry is further configured to cause the memory system to:

delete the metadata from the cache based at least in part on transferring the metadata and the subset of the data to the zone in the one or more memory arrays; and delete, based at least in part on deleting the metadata, the one or more first entries from the cache.

6. The memory system of claim 1, wherein, to transfer the metadata and the subset of the data from the cache to the zone in the one or more memory arrays, the processing circuitry is configured to cause the memory system to:

write the subset of the data to sequential pages of one or more memory blocks included in the zone of the one or more memory arrays; and write the metadata to one or more pages within the zone of the one or more memory arrays.

7. The memory system of claim 1, wherein:

the one or more first entries are associated with a first address range within the cache;

the one or more second entries are associated with a second address range within the cache; and an offset between the first address range and the second address range is based at least in part on an index of the zone and a quantity of addresses included in each set of a plurality of sets of entries stored in the cache.

8. The memory system of claim 1, wherein the processing circuitry is further configured to cause the memory system to:

receive one or more write commands comprising the subset of the data and one or more logical block addresses associated with the subset of the data, the one or more logical block addresses associated with the zone in the one or more memory arrays;

store, to the cache of the memory system based at least in part on the one or more write commands, one or more third entries that map the one or more logical block addresses to respective physical addresses of the plurality of physical addresses in the cache; and write the subset of the data to the respective physical addresses based at least in part on the one or more third entries, wherein transferring the metadata and the subset of the data from the cache to the one or more memory arrays is based at least in part on the subset of the data that is written to the cache filling an address space of the zone.

9. The memory system of claim 1, wherein the first type of memory cell comprises single-level memory cell type and the second type of memory cell comprises a multi-level memory cell type.

10. The memory system of claim 1, wherein the metadata indicates a type of the zone, a state of the zone, a pointer to a writeable block in the zone, or a capacity of the zone, or any combination thereof.

11. A method by a memory system, comprising:

receiving, by the memory system, a zone descriptor command comprising metadata associated with a zone of a plurality of zones of a memory array of the memory system;

storing, to a cache of the memory system based at least in part on the zone descriptor command, one or more first entries that map the metadata to first physical addresses of a plurality of physical addresses in the cache, wherein the cache comprises one or more second entries that map data associated with the plurality of zones to respective second physical addresses of the plurality of physical addresses in the cache;

writing the metadata to the first physical addresses in the cache based at least in part on the one or more first entries; and transferring the metadata and a subset of the data mapped by the one or more second entries from the cache to the zone in the memory array based at least in part on writing the metadata to the first physical addresses in the cache, wherein the subset of the data is associated with the zone.

12. The method of claim 11, further comprising:

receiving a second zone descriptor command comprising second metadata associated with the zone;

updating the one or more first entries to map the second metadata to third physical addresses of the plurality of physical addresses in the cache; and writing the second metadata to the third physical addresses in the cache based at least in part on the one or more first entries.

13. The method of claim 11, further comprising:

receiving a second zone descriptor command comprising second metadata associated with a second zone of the plurality of zones;

storing, to the cache based at least in part on the second zone descriptor command, one or more third entries that map the second metadata to third physical addresses of the plurality of physical addresses in the cache; and writing the second metadata to the third physical addresses in the cache based at least in part on the one or more third entries.

14. The method of claim 11, further comprising:

receiving, from a host system coupled with the memory system, a zone descriptor read command comprising an indication of the zone;

identifying, based at least in part on the indication of the zone, the one or more first entries that map the metadata to the first physical addresses within the cache;

retrieving, from the first physical addresses, the metadata based at least in part on identifying the one or more first entries; and transmitting, based at least in part on the zone descriptor read command and retrieving the metadata, the metadata to the host system.

15. The method of claim 11, further comprising:

deleting the metadata from the cache based at least in part on transferring the metadata and the subset of the data to the zone in the memory array; and deleting, based at least in part on deleting the metadata, the one or more first entries from the cache.

16. The method of claim 11, wherein transferring the metadata and the subset of the data from the cache to the zone in the memory array comprises:

writing the subset of the data to sequential pages of one or more memory blocks included in the zone of the memory array; and writing the metadata to one or more pages within the zone of the memory array.

17. The method of claim 16, further comprising:

storing, in the memory array, an indication of a starting logical block address associated with the zone and a logical block address associated with the one or more pages for the metadata.

18. The method of claim 16, further comprising:

storing, in the memory array, null data within one or more pages between the subset of the data and an ending address of the zone based at least in part on a size of the subset of the data being less than a size of the zone.

19. The method of claim 11, wherein the one or more first entries are associated with a first address range within the cache; the one or more second entries are associated with a second address range within the cache; and an offset between the first address range and the second address range is based at least in part on an index of the zone and a quantity of addresses included in each set of a plurality of sets of entries stored in the cache.

20. The method of claim 19, wherein a starting address for respective metadata included in each set of the plurality of sets of entries stored in the cache is aligned with a starting page boundary for the respective set.

21. The method of claim 11, further comprising:

receiving one or more write commands comprising the subset of the data and one or more logical block addresses associated with the subset of the data, the one or more logical block addresses associated with the zone in the memory array;

storing, to the cache of the memory system based at least in part on the one or more write commands, one or more third entries that map the one or more logical block addresses to respective physical addresses of the plurality of physical addresses in the cache; and writing the subset of the data to the respective physical addresses based at least in part on the one or more third entries, wherein transferring the metadata and the subset of the data from the cache to the memory array is based at least in part on the subset of the data that is written to the cache filling an address space of the zone.

22. The method of claim 11, further comprising:

activating the zone for memory accesses, wherein storing the one or more first entries and writing the metadata to the cache is based at least in part on activating the zone associated with the one or more first entries and the metadata;

deactivating the zone based at least in part on transferring the metadata and the subset of the data to the memory array; and deleting the one or more first entries and the metadata from the cache based at least in part on deactivating the zone.

23. The method of claim 11, wherein the memory array comprises a plurality of multi-level memory cells and the cache comprises a plurality of single-level memory cells.

24. The method of claim 11, wherein the metadata indicates a type of the zone, a state of the zone, a pointer to a writeable block in the zone, or a capacity of the zone, or any combination thereof.

25. A non-transitory computer-readable medium comprising code comprising instructions which, when executed by processing circuitry of an electronic device, cause the electronic device to:

receive, by the electronic device, a zone descriptor command comprising metadata associated with a zone of a plurality of zones of a memory array of the electronic device;

store, to a cache of the electronic device based at least in part on the zone descriptor command, one or more first entries that map the metadata to first physical addresses of a plurality of physical addresses in the cache, wherein the cache comprises one or more second entries that map data associated with the plurality of zones to respective second physical addresses of the plurality of physical addresses in the cache;

write the metadata to the first physical addresses in the cache based at least in part on the one or more first entries; and transfer the metadata and a subset of the data mapped by the one or more second entries from the cache to the zone in the memory array based at least in part on writing the metadata to the first physical addresses in the cache, wherein the subset of the data is associated with the zone.

26. A memory system, comprising:

one or more caches comprising a plurality of single-level memory cells;

one or more memory arrays coupled with the one or more caches and comprising a plurality of multi-level memory cells, wherein the plurality of multi-level memory cells are included in a plurality of zones each comprising one or more blocks of memory cells; and processing circuitry configured to cause the memory system to:

receive a zone descriptor command comprising metadata associated with a zone of the plurality of zones of the one or more memory arrays;

store, to a logical-to-physical table in a cache of the one or more caches based at least in part on the zone descriptor command, one or more first logical-to-physical entries that map the metadata to first physical addresses of a plurality of physical addresses in the cache, wherein the cache is configured to store data associated with the plurality of zones;

write the metadata to the first physical addresses in the cache based at least in part on the one or more first logical-to-physical entries; and transfer the metadata and a subset of the data from the cache to one or more multi-level memory cells in the zone in the one or more memory arrays based at least in part on writing the metadata to the first physical addresses in the cache, wherein the subset of the data is associated with the zone.

27. The memory system of claim 26, wherein the processing circuitry is further configured to:

receive a second zone descriptor command comprising second metadata associated with the zone;

update the one or more first logical-to-physical entries to map the second metadata to second physical addresses of the plurality of physical addresses in the cache; and write the second metadata to the second physical addresses in the cache based at least in part on the one or more first logical-to-physical entries.

28. The memory system of claim 26, wherein the processing circuitry is further configured to:

receive a second zone descriptor command comprising second metadata associated with a second zone of the plurality of zones;

store, to the cache based at least in part on the second zone descriptor command, one or more second logical-to-physical entries that map the second metadata to second physical addresses of the plurality of physical addresses in the cache; and write the second metadata to the second physical addresses in the cache based at least in part on the one or more second logical-to-physical entries.

29. A method, comprising:

receiving, by a memory system, a zone descriptor command comprising metadata associated with a zone of a plurality of zones of a memory array of the memory system, wherein the memory array comprises a plurality of multi-level memory cells;

storing, to a logical-to-physical table in a cache of the memory system based at least in part on the zone descriptor command, one or more first logical-to-physical entries that map the metadata to first physical addresses of a plurality of physical addresses in a cache, wherein the cache comprises a plurality of single-level memory cells and is configured to store data associated with the plurality of zones;

writing the metadata to the first physical addresses in the cache based at least in part on the one or more first logical-to-physical entries; and transferring the metadata and a subset of the data from the cache to one or more multi-level memory cells in the zone in the memory array based at least in part on writing the metadata to the first physical addresses in the cache, wherein the subset of the data is associated with the zone.

30. The method of claim 29, further comprising:

receiving a second zone descriptor command comprising second metadata associated with the zone;

updating the one or more first logical-to-physical entries to map the second metadata to second physical addresses of the plurality of physical addresses in the cache; and writing the second metadata to the second physical addresses in the cache based at least in part on the one or more first logical-to-physical entries.

* * * * *